US012281622B1

(12) United States Patent
Gwidt et al.

(10) Patent No.: US 12,281,622 B1
(45) Date of Patent: Apr. 22, 2025

(54) FUEL CONTROL SYSTEM FOR INTERNAL COMBUSTION ENGINE HAVING MULTIPLE INJECTION SYSTEMS

(71) Applicant: GM Global Technology Operations LLC, Detroit, MI (US)

(72) Inventors: J. Michael Gwidt, Brighton, MI (US); Jeffrey M. Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/631,664

(22) Filed: Apr. 10, 2024

(51) Int. Cl.
*F02D 19/06* (2006.01)
*F02M 55/02* (2006.01)

(52) U.S. Cl.
CPC ....... *F02D 19/061* (2013.01); *F02D 19/0684* (2013.01); *F02D 19/0689* (2013.01);
(Continued)

(58) Field of Classification Search
CPC ...... B60W 20/18; B60W 10/06; B60W 10/08; B60W 2530/211; F02D 19/084; F02D 41/0025; F02D 41/20; F02D 41/2477; F02D 41/2467; F02D 41/401; F02D 41/3094; F02D 2200/06; F02D 2200/0602; F02D 2200/0611; F02D 2200/0612; F02D 2200/0614; F02D 2200/0616; F02D 2200/606; F02D 2200/701; F02D 2250/04; F02D 2041/224; F02D 2041/3881; F02D 2041/2058; F02D 2041/2027; F02D 2041/2055; F02D 2041/2051; Y02T 10/30
(Continued)

(56) References Cited

U.S. PATENT DOCUMENTS 10,801,428 B2 * 10/2020 Kashid .................. B60W 20/18
11,035,316 B1 * 6/2021 Pursifull .............. F02M 69/465
(Continued)

FOREIGN PATENT DOCUMENTS

DE 102006042893 A1 2/2008
DE 102008002216 A1 10/2009

OTHER PUBLICATIONS

German Office Action for German Application No. 102024113078.4; dated Dec. 10, 2024; 5 pages.

*Primary Examiner* — Logan M Kraft
*Assistant Examiner* — Johnny H Hoang
(74) *Attorney, Agent, or Firm* — CANTOR COLBURN LLP

(57) ABSTRACT

A fuel system comprises a first fuel rail. A first fuel delivery system, including a first plurality of fuel injectors, is connected to the first fuel rail. The first plurality of fuel injectors injects an amount of fuel into a first portion of an engine. A second fuel rail has a second fuel delivery system, including a second plurality of fuel injectors. The second plurality of fuel injectors inject an amount of fuel into a second portion of the engine, distinct from the first portion. A controller, operatively connected to the first fuel delivery system and the second fuel delivery system selectively enables and disables operation of the first fuel delivery system and the second fuel delivery system based on one of a detected temperature and a detected pressure of fuel passing to corresponding ones of the first plurality of fuel injectors and the second plurality of fuel injectors.

18 Claims, 4 Drawing Sheets

(52) U.S. Cl.
CPC ....... *F02D 19/0692* (2013.01); *F02M 55/025* (2013.01); *F02D 2200/0602* (2013.01); *F02D 2200/0606* (2013.01)

(58) Field of Classification Search
USPC ........................... 701/103–105; 123/445–481
See application file for complete search history.

(56) References Cited

U.S. PATENT DOCUMENTS

| | | | | |
|---|---|---|---|---|
| 11,359,568 | B1 * | 6/2022 | Oshinsky | F02D 41/126 |
| 11,692,501 | B1 * | 7/2023 | Kiwan | F02D 41/2467<br>701/103 |
| 2017/0022927 | A1 * | 1/2017 | Sanborn | F02D 41/2406 |
| 2020/0263616 | A1 * | 8/2020 | Kashid | F02D 19/088 |

* cited by examiner

FUEL CONTROL SYSTEM FOR INTERNAL COMBUSTION ENGINE HAVING MULTIPLE INJECTION SYSTEMS

INTRODUCTION

The subject disclosure relates to the art of fuel control systems and, more particularly, to a fuel control system for an internal combustion engine having multiple injection systems.

Internal combustion engines include a fuel system that combines liquid fuel with air to form a combustible mixture. The combustible mixture is introduced into a cylinder, compressed, and ignited to form pressurized gases. The pressurized gases move a piston in the cylinder to create energy to power the vehicle. In some cases, the fuel system may include a carburetor that introduces fuel into a manifold to be combined with air. In other cases, the fuel system may include fuel injectors that create an atomized burst of an air-fuel mixture that is passed into the cylinder.

In some cases, the fuel injectors may be arranged to deliver the atomized fuel into a manifold which leads into the cylinder. In other cases, the injector may introduce the fuel directly into the cylinder. In still other cases, the engine may include a first fuel delivery system including injectors that deliver fuel into the manifold and a second fuel delivery system including injectors that deliver fuel directly into the cylinder. One fuel system may operate during idle, and the other fuel system may operate when the vehicle is in motion.

If the fuel system operating at idle is active for too long a period, engine temperatures and/or fuel pressures may exceed desired parameters. Increasing engine temperatures and/or fuel pressures can detract from an overall operating efficiency of the vehicle and may also place a strain on certain engine components. Accordingly, it is desirable to provide a system for controlling operation of the first and second fuel delivery systems in order to maintain temperatures and/or fuel pressures within selected operating parameters.

SUMMARY

In one exemplary embodiment a fuel system comprises a first fuel rail configured to be connected to a source of fuel. A first fuel delivery system including a first plurality of fuel injectors is connected to the first fuel rail. The first plurality of fuel injectors is configured to inject an amount of fuel into a first portion of an internal combustion engine. A second fuel rail is configured to be connected to the source of fuel. A second fuel delivery system including a second plurality of fuel injectors is connected to the second fuel rail. The second plurality of fuel injectors is configured to inject an amount of fuel into a second portion of the internal combustion engine, which is distinct from the first portion. A controller is operatively connected to the first fuel delivery system and the second fuel delivery system. The controller is configured to selectively enable and disable operation of the first fuel delivery system and the second fuel delivery system based on one of a detected temperature and a detected pressure of fuel passing to corresponding ones of the first plurality of fuel injectors and the second plurality of fuel injectors.

In addition to one or more of the features described herein, the fuel system further comprises a first pressure sensor and a first temperature sensor mounted in the first fuel rail and a second temperature sensor, and a second pressure sensor mounted in the second fuel rail.

In addition to one or more of the features described herein the first plurality of fuel injectors is configured to inject fuel upstream of an intake valve of the internal combustion engine.

In addition to one or more of the features described herein, the second plurality of fuel injectors is configured to inject an amount of fuel directly into a cylinder of the internal combustion engine downstream of the intake valve.

In addition to one or more of the features described herein, the controller is configured to disable the second fuel delivery system during select operating periods of the internal combustion engine.

In addition to one or more of the features described herein the controller is configured to enable both the first fuel delivery system and the second fuel delivery system if one of the temperature sensed in the first fuel rail and the pressure sensed in the second fuel rail exceeds a selected value.

In another exemplary embodiment a vehicle comprises a body defining a passenger compartment. A plurality of wheels supports the body. An internal combustion engine is supported in the body and is operatively connected to at least one of the plurality of wheels. The internal combustion engine includes a plurality of cylinders, an intake system including an intake plenum, and an intake valve selectively connecting the intake system with at least one of the plurality of cylinders. A fuel system is fluidically connected to the internal combustion engine and comprises a first fuel rail configured to be connected to a source of fuel. A first fuel delivery system including a first plurality of fuel injectors is connected to the first fuel rail. The first plurality of fuel injectors is configured to inject an amount of fuel into a first portion of the internal combustion engine. A second fuel rail is configured to be connected to the source of fuel. A second fuel delivery system including a second plurality of fuel injectors is connected to the second fuel rail. The second plurality of fuel injectors is configured to inject an amount of fuel into a second portion of the internal combustion engine that is distinct from the first portion. A controller is operatively connected to the first plurality of fuel injectors and the second plurality of fuel injectors. The controller is configured to selectively enable and disable operation of select ones of the first plurality of fuel injectors and the second plurality of fuel injectors based on one of a detected temperature and a detected pressure of fuel passing to corresponding ones of the first fuel rail and the second fuel rail.

In addition to one or more of the vehicle features described herein the fuel system further comprises a first pressure sensor and a first temperature sensor mounted in the first fuel rail and a second temperature sensor, and a second pressure sensor mounted in the second fuel rail.

In addition to one or more of the vehicle features described herein the first plurality of fuel injectors are configured to inject fuel into the intake plenum of the intake valve.

In addition to one or more of the vehicle features described herein the second plurality of fuel injectors is configured to inject an amount of fuel directly into each of the plurality of cylinders.

In addition to one or more of the vehicle features described herein the controller is configured to disable the second fuel delivery system during select operating periods of the internal combustion engine.

In addition to one or more of the vehicle features described herein the controller is configured to enable both the first fuel delivery system and the second fuel delivery system if one of the temperatures sensed in the first fuel rail and the pressure sensed in the second fuel rail exceeds a selected value.

In yet another exemplary embodiment a method of operating multiple fuel injection systems for an internal combustion engine supported in a vehicle comprises injecting fuel into a first portion of the internal combustion engine through a first plurality of fuel injectors and injecting fuel into a second portion of the internal combustion engine, that is distinct from the first portion, through a second plurality of fuel injectors. The method further comprises detecting an operating mode of the vehicle, disabling the first plurality of fuel injectors based on the operating mode of the vehicle, detecting one of a temperature and a pressure of fuel at the first plurality of fuel injectors and activating the first plurality of fuel injectors if the one of the temperature and pressure of the fuel exceeds a selected threshold.

In addition to one or more of the steps described herein, wherein activating the first plurality of fuel injectors includes detecting that the temperature of fuel at each of the first plurality of fuel injectors exceeds a selected temperature threshold.

In addition to one or more of the steps described herein, wherein activating a fuel pump to provide fuel to the first plurality of fuel injectors when the temperature of fuel at each of the first plurality of fuel injectors exceeds the selected temperature threshold in order to support at least 10 injections of fuel.

In addition to one or more of the steps described herein, wherein activating the first plurality of fuel injectors includes detecting that the pressure of fuel at each of the first plurality of fuel injectors exceeds a selected pressure threshold.

In addition to one or more of the steps described herein, wherein activating the first plurality of fuel injectors when the pressure of fuel at the first plurality of fuel injectors exceeds the selected pressure threshold includes delivering fuel into the internal combustion engine without activating a fuel pump.

In addition to one or more of the steps described herein, wherein activating the first plurality of fuel injectors when the pressure of fuel at the first plurality of fuel injectors exceeds the selected pressure threshold includes delivering fuel into the internal combustion engine without activating the fuel pump includes delivering no more than 3 injections of fuel into the internal combustion engine.

In addition to one or more of the steps described herein, the method further comprising determining that the one of the temperature and the pressure of the fuel at the first plurality of fuel injectors has fallen below the selected threshold and deactivating the first plurality of fuel injectors.

In addition to one or more of the steps described herein, the method further comprising detecting the operating mode of the vehicle before deactivating the first plurality of fuel injectors and deactivating the first plurality of fuel injectors if the operating mode indicates that the vehicle is at idle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
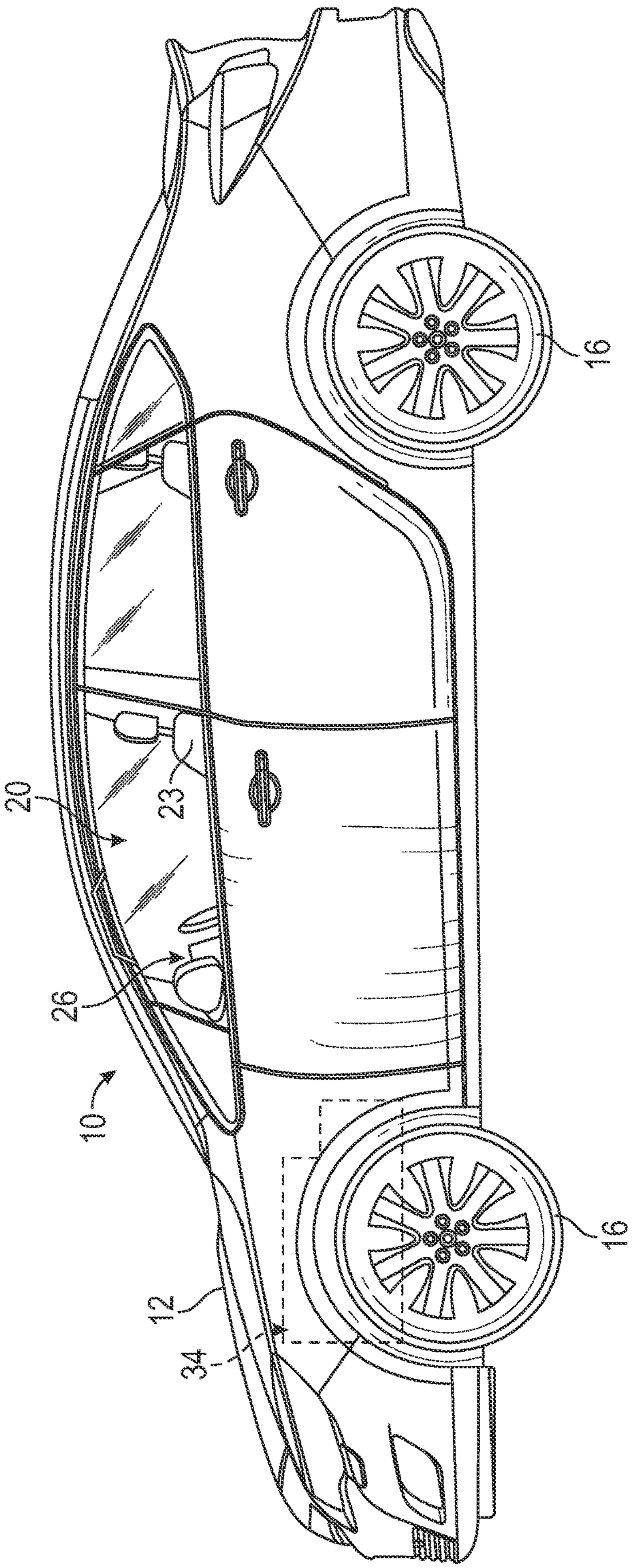
FIG. 1 is a left side view of a vehicle including an internal combustion engine and fuel control system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. Vehicle 10 includes an internal combustion engine (ICE) 34 that provides power to one or more of the plurality of wheels 16.

Figure 2:
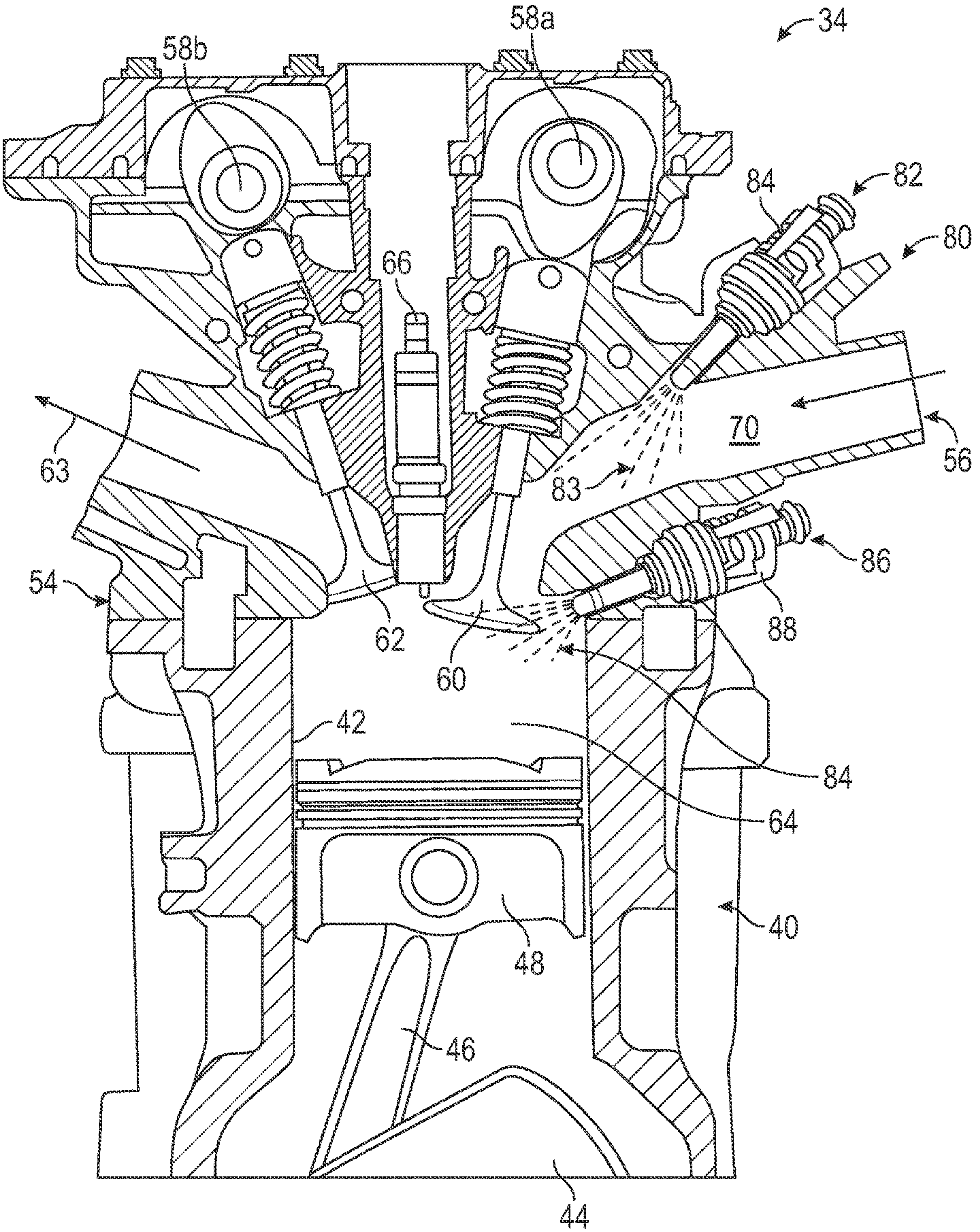
FIG. 2 is a partial sectional view of the internal combustion engine of FIG. 1 including a fuel system having multiple injection systems, in accordance with a non-limiting example.

Referring to FIG. 2, ICE engine 34 includes an engine block 40 including a plurality of cylinders, one of which is indicated at 42. Engine block 40 supports a crankshaft 44 which, in turn, supports a connecting rod 46 joined to a piston 48. As crankshaft 44 rotates, piston 48 reciprocates within cylinder 42. A cylinder head 54 including an intake system 56 is connected to engine block 40. Cylinder head 54 supports a first cam shaft **58*a* and a second cam shaft 58*b* that rotated to open an intake valve 60 and an exhaust valve 62. Springs (not separately labeled) associated with intake valve 60 and exhaust valve 62** provide a closing force to the valves.

ICE engine 34 includes a combustion chamber 64 defined between piston 48 and cylinder head 54. A spark plug 66 arranged in cylinder head 54 selectively ignites a combustible mixture to move piston 48. In some cases, the combustible mixture is formed in an intake plenum 70 of intake system 56 and passed into combustion chamber 64 through intake valve 60. Spent gases formed after combustion are passed from combustion chamber 64 as exhaust gases 63 through exhaust valve 62. In other cases, the combustible mixture is introduced directly into combustion chamber 64. In each case, a fuel system 80 creates the combustible mixture by delivering atomized sprays of fuel 83 and 84 into ICE 34.

Figure 3:
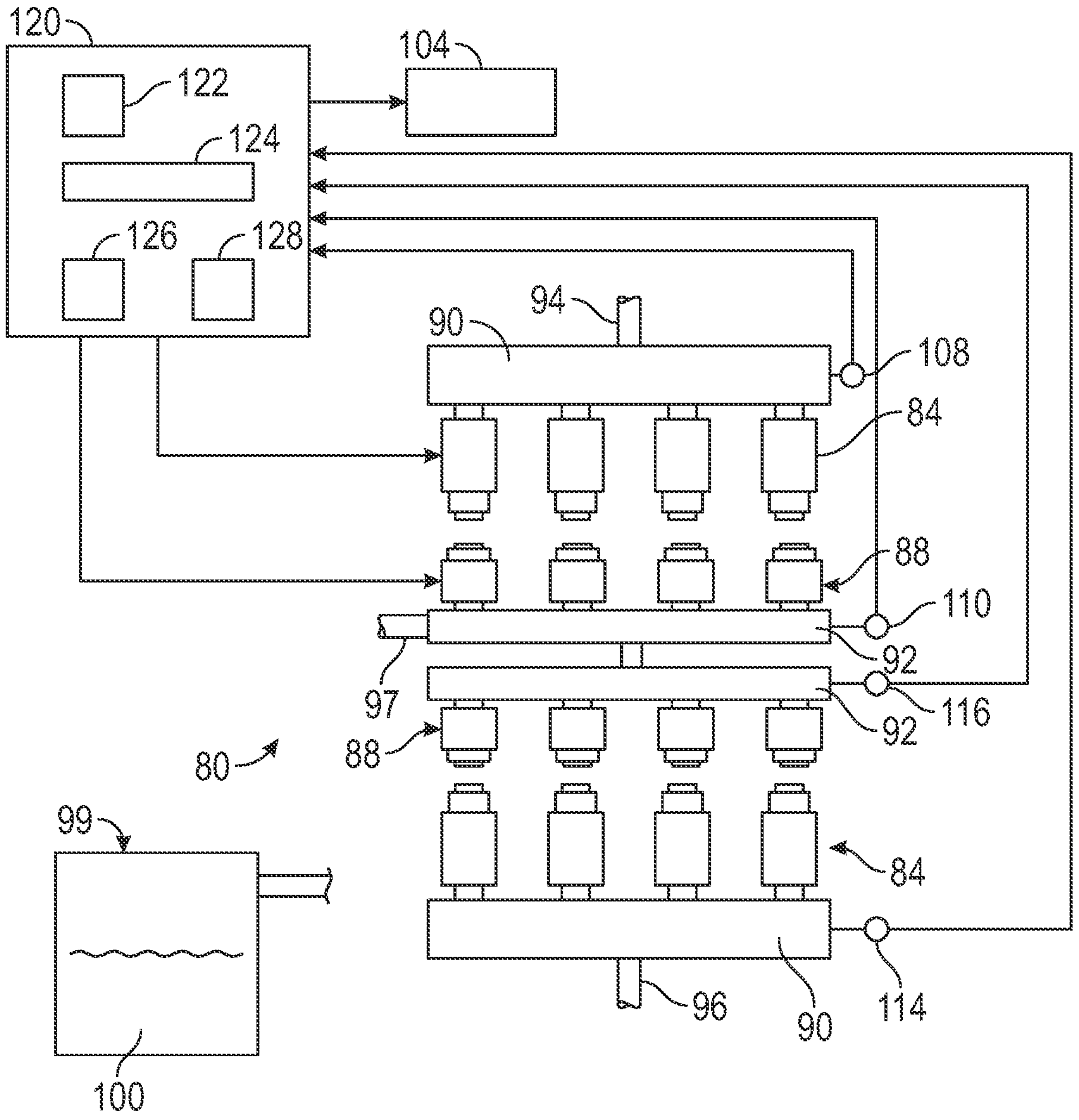
FIG. 3 is a schematic view of the fuel control system of the internal combustion engine of FIG. 2, in accordance with a non-limiting example.

Reference will now follow to FIG. 3 with continued reference to FIG. 2, in describing fuel system 80 in accordance with a non-limiting example. Fuel system 80 includes a first fuel delivery system 82 defined by a first plurality of fuel injectors 84 and a second fuel delivery system 86 defined by a second plurality of fuel injectors 88. First and second pluralities of fuel injectors 84 and 88 are configured to introduce fuel into different portions of ICE engine 34 as will be detailed more fully herein. In one non-limiting example, first plurality of fuel injectors 84 are mounted to intake system 56 upstream of intake valve 60 and the second plurality of fuel injectors 88 are mounted to cylinder head 54 and positioned to introduce an amount of fuel directly into combustion chamber 64.

In a non-limiting example, first plurality of fuel injectors 84 are connected to a first fuel rail 90 and second plurality of fuel injectors 88 are connected to a second fuel rail 92. First fuel rail 90 includes a first inlet 94 and a second inlet 96 and second fuel rail 92 includes a third inlet 97. At this point, it should be understood that the number and location of inlets may vary as may the particular location of first fuel rail 90 and second fuel rail 92. Regardless of the configuration, first fuel rail 90 and second fuel rail 92 are fluidically connected to a source 99 of fuel 100.

A fuel pump 104 is fluidically connected between source of fuel 100 and first and second fuel rails 90 and 92. Fuel pump 104 delivers a pressurized flow of fuel into each fuel rail 90, 92 to be injected into combustion chamber 64 through first plurality of fuel injectors 84 and/or second plurality of fuel injectors 86 as demand dictates. In a non-limiting example, a first temperature sensor 108 is arranged in first fuel rail 90 and a second temperature sensor 110 is arranged in second fuel rail 92. In addition, a first pressure sensor 114 is arranged in first fuel rail 90 and a second pressure sensor 116 is arranged in second fuel rail 92.

First and second temperature sensors 108/110 and first and second pressure sensors 114/116 provide feedback to a fuel control system, 120 for injecting fuel from the first plurality of fuel injectors 84 and/or the second plurality of fuel injectors 88. Fuel control system 120 includes a controller having a central processing unit (CPU) 122, a non-volatile memory 124, a temperature evaluation module 126, and a pressure evaluation module 128. While shown as being co-located, components of controller 120 may be arranged in different areas of vehicle 10. Further, while shown as being separate modules, temperature evaluation module 126 and pressure evaluation module 128 may be arranged in a single, combined, temperature/pressure evaluation module.

Figure 4:
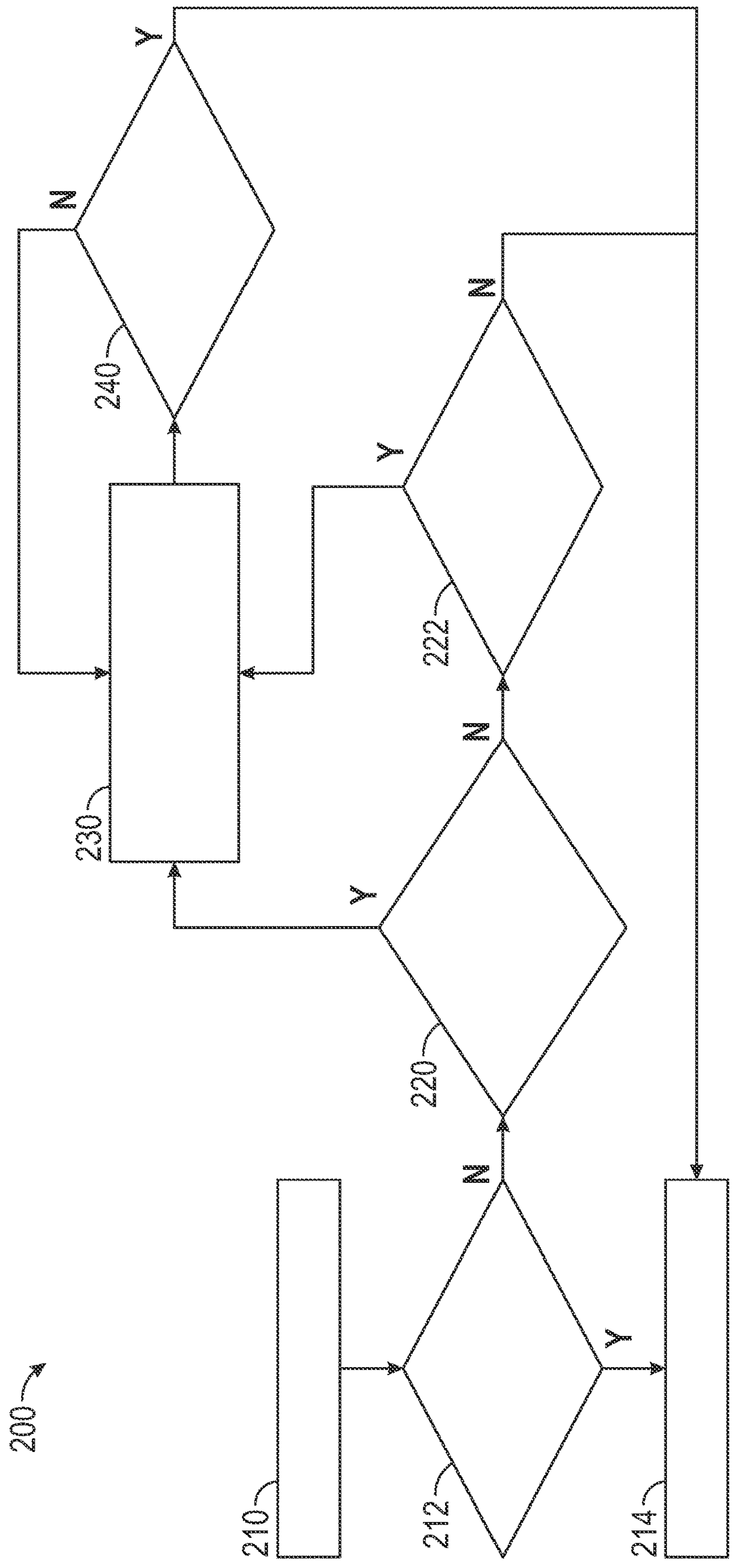
FIG. 4 is a flow chart illustrating a method of controlling fuel delivery through the fuel system of FIG. 3, in accordance with a non-limiting example.

Reference will now follow to FIG. 4 in describing a method 200 of controlling fuel delivery through the first plurality of fuel injectors 84 and second plurality of fuel injectors 86 into combustion chamber 64. Method 200 is initiated in block 210. At this point a determination is made whether both the first plurality of fuel injectors 84 and the second plurality of fuel injectors 88 are active in block 212. In an example, controller 120 may determine an operating mode of vehicle 10. In a non-limiting example, during periods of idle, the first plurality of fuel injectors 84 may be active and second plurality of fuel injectors 88 may be inactive. As such, fuel is only delivered into combustion chamber 64 through intake valve 60.

If both the first plurality of fuel injectors 84 and the second plurality of fuel injectors 88 are active, method 200 ends at block 214. If only one of the first plurality of fuel injectors 84 and the second plurality of fuel injectors 88 is active, for example during idle, temperature evaluation module 126 reads second temperature sensor 110 in block 220 to determine the temperature in second fuel rail 92. The sensed temperature is compared with a temperature threshold value stored in non-volatile memory 124. If the temperature in second fuel rail 92 is within a specified temperature limit, method 200 shifts to block 222.

In block 222, pressure evaluation module 128 reads second pressure sensor 116 to determine the fuel pressure in second fuel rail 92. The sensed pressure is compared with a pressure threshold value stored in non-volatile memory 124. If the fuel pressure in second fuel rail 92 is within a specified pressure limit, method 200 shifts to block 214 and ends. Method 200 may be repeated continuously or at selected intervals depending on the operating mode of vehicle 10, operating temperatures, and ambient temperature. For example, method 200 may be repeated more often during idle in a hot climate and less often during highway travel in a cold climate.

In a non-limiting example, if the temperature sensed in block 220 is higher than prescribed temperature limits stored in non-volatile memory 124, method 200 shifts to block 230 to reenable second plurality of fuel injectors 88. Controller 120 may activate fuel pump 104 to facilitate ten (10) or more injections of fuel through second plurality of fuel injectors 88 to reduce temperatures in second fuel rail 92. Temperature evaluation module 126 again samples second temperature sensor 110 to determine what effect injection had on fuel temperature in second fuel rail 92 at block 240. If the fuel temperature has dropped below prescribed limits, method 200 passes to block 214 and ends. If, on the other hand, fuel temperature remains elevated, method 200 returns to block 230. At this point, fuel pump 104 is again activated and the second plurality of fuel injectors are re-activated to facilitate additional fuel injections. This control loop repeats until the fuel temperature in second fuel rail 92 is within prescribed limits.

In a non-limiting example, if the temperature sensed in block 220 is within the prescribed temperature limits stored in non-volatile memory 124, but pressure evaluation module 128 determines that pressure sensed in block 222 is outside prescribed pressure limits stored in non-volatile memory 124, method 200 shifts to block 230 to reenable second plurality of fuel injectors 88. In this case, controller 120 may only activate the second plurality of fuel injectors 88 to facilitate one or two (1 or 2) injections of fuel. As such, when sensed pressure is outside of stored pressure limits, fuel pump 104 may not need to be activated in order to reduce pressure in second fuel rail 92.

Pressure evaluation module 128 again samples second temperature sensor 110 to determine what effect injection had on fuel pressure in second fuel rail 92. If the fuel pressure has dropped below prescribed limits, method 200 passes to block 214 and ends. If, on the other hand, fuel pressure remains elevated, method 200 returns to block 230. The second plurality of fuel injectors are re-activated to facilitate additional fuel injections. This control loop repeats until fuel pressure in second fuel rail 92 is within prescribed limits.

At this point it should be understood that the non-limiting examples described herein provide a system for controlling an internal combustion engine having multiple injections systems to alleviate pressure and temperature parameters in fuel supply rails. Maintaining temperature and pressure within prescribed limits protects pressure relief components. That is, when the temperature and pressure of fuel in the fuel rail(s) are within limits, a pressure relief valve need not be activated. Reducing the number of activations of the pressure relief valve increases an overall operational life of the component. Further, while described in terms of disabling the second plurality of fuel injectors, e.g., direct injection injectors, the method can also control operation of indirect injections.

The terms “a” and “an” do not denote a limitation of quantity, but rather denote the presence of at least one of the referenced item. The term “or” means “and/or” unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

The term "about" is intended to include the degree of error associated with measurement of the particular quantity based upon the equipment available at the time of filing the application. For example, "about" can include a range of ±8% of a given value.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A fuel system comprising:

a first fuel rail configured to be connected to a source of fuel;

a first fuel delivery system, including a first plurality of fuel injectors, connected to the first fuel rail, the first plurality of fuel injectors being configured to inject an amount of fuel into a first portion of an internal combustion engine;

a second fuel rail configured to be connected to the source of fuel;

a second fuel delivery system, including a second plurality of fuel injectors, connected to the second fuel rail, the second plurality of fuel injectors being configured to inject an amount of fuel into a second portion of the internal combustion engine that is distinct from the first portion; and a controller operatively connected to the first fuel delivery system and the second fuel delivery system, the controller being configured to selectively enable and disable operation of the first fuel delivery system and the second fuel delivery system based on one of a detected temperature and a detected pressure of fuel passing to corresponding ones of the first plurality of fuel injectors and the second plurality of fuel injectors;

wherein the controller is configured to selectively enable and disable operation of the first fuel delivery system and the second fuel delivery system to maintain the detected temperatures and pressures in the first fuel rail and the second fuel rail below a preselected temperature threshold and/or below a preselected pressure threshold.

2. The fuel system according to claim 1, further comprising a first pressure sensor and a first temperature sensor mounted in the first fuel rail and a second temperature sensor and a second pressure sensor mounted in the second fuel rail.

3. The fuel system according to claim 2, wherein the first plurality of fuel injectors is configured to inject fuel upstream of an intake valve of the internal combustion engine.

4. The fuel system according to claim 3, wherein the second plurality of fuel injectors is configured to inject an amount of fuel directly into a cylinder of the internal combustion engine downstream of the intake valve.

5. The fuel system according to claim 4, wherein the controller is configured to disable the second fuel delivery system during select operating periods of the internal combustion engine.

6. A vehicle comprising:

a body defining a passenger compartment;

a plurality of wheels supporting the body;

an internal combustion engine supported in the body and operatively connected to at least one of the plurality of wheels, the internal combustion engine including a plurality of cylinders, an intake system including an intake plenum, and an intake valve selectively connecting the intake system with at least one of the plurality of cylinders; and a fuel system fluidically connected to the internal combustion engine, the fuel system comprising:

a first fuel rail configured to be connected to a source of fuel;

a first fuel delivery system, including a first plurality of fuel injectors, connected to the first fuel rail, the first plurality of fuel injectors being configured to inject an amount of fuel into a first portion of the internal combustion engine;

a second fuel rail configured to be connected to the source of fuel;

a second fuel delivery system, including a second plurality of fuel injectors, connected to the second fuel rail, the second plurality of fuel injectors being configured to inject an amount of fuel into a second portion of the internal combustion engine that is distinct from the first portion; and a controller operatively connected to the first plurality of fuel injectors and the second plurality of fuel injectors, the controller being configured to selectively enable and disable operation of select ones of the first plurality of fuel injectors and the second plurality of fuel injectors based on one of a detected temperature and a detected pressure of fuel passing to corresponding ones of the first fuel rail and the second fuel rail;

wherein the controller is configured to selectively enable and disable operation of the first fuel delivery system and the second fuel delivery system to maintain the detected temperatures and pressures in the first fuel rail and the second fuel rail below a preselected temperature threshold and/or below a preselected pressure threshold.

7. The vehicle according to claim 6, further comprising a first pressure sensor and a first temperature sensor mounted in the first fuel rail and a second temperature sensor and a second pressure sensor mounted in the second fuel rail.

8. The vehicle according to claim 7, wherein the first plurality of fuel injectors are configured to inject fuel into the intake plenum of the intake valve.

9. The vehicle according to claim 8, wherein the second plurality of fuel injectors is configured to inject an amount of fuel directly into each of the plurality of cylinders.

10. The vehicle according to claim 9, wherein the controller is configured to disable the second fuel delivery system during select operating periods of the internal combustion engine.

11. A method of operating multiple fuel injection systems for an internal combustion engine supported in a vehicle, the method comprising:

injecting fuel into a first portion of the internal combustion engine through a first plurality of fuel injectors;

injecting fuel into a second portion of the internal combustion engine that is distinct from the first portion through a second plurality of fuel injectors;

detecting an operating mode of the vehicle;

disabling the first plurality of fuel injectors based on the operating mode of the vehicle;

detecting one of a temperature and a pressure of fuel at the first plurality of fuel injectors at a first fuel rail; and activating the first plurality of fuel injectors if the one of the temperature and pressure of the fuel exceeds a selected threshold to maintain the detected temperature and pressure in the first fuel rail below a preselected temperature threshold and below a preselected pressure threshold.

12. The method of claim 11, wherein activating the first plurality of fuel injectors includes detecting that the temperature of fuel at each of the first plurality of fuel injectors exceeds a selected temperature threshold.

13. The method of claim 12, further comprising activating a fuel pump to provide fuel to the first plurality of fuel injectors when the temperature of fuel at each of the first plurality of fuel injectors exceeds the selected temperature threshold in order to support at least 10 injections of fuel.

14. The method of claim 11, wherein activating the first plurality of fuel injectors includes detecting that the pressure of fuel at each of the first plurality of fuel injectors exceeds a selected pressure threshold.

15. The method of claim 14, wherein activating the first plurality of fuel injectors when the pressure of fuel at the first plurality of fuel injectors exceeds the selected pressure threshold includes delivering fuel into the internal combustion engine without activating a fuel pump.

16. The method of claim 15, wherein activating the first plurality of fuel injectors when the pressure of fuel at the first plurality of fuel injectors exceeds the selected pressure threshold includes delivering fuel into the internal combustion engine without activating the fuel pump includes delivering no more than 3 injections of fuel into the internal combustion engine.

17. The method of claim 11, further comprising:

determining that the one of the temperature and the pressure of the fuel at the first plurality of fuel injectors has fallen below the selected threshold; and deactivating the first plurality of fuel injectors.

18. The method of claim 17, further comprising:

detecting the operating mode of the vehicle before deactivating the first plurality of fuel injectors; and deactivating the first plurality of fuel injectors if the operating mode indicates that the vehicle is at idle.

* * * * *